United States Patent [19]
Warburton

[11] Patent Number: 5,774,522
[45] Date of Patent: Jun. 30, 1998

[54] METHOD AND APPARATUS FOR DIGITALLY BASED HIGH SPEED X-RAY SPECTROMETER FOR DIRECT COUPLED USE WITH CONTINUOUS DISCHARGE PREAMPLIFIERS

[76] Inventor: William K. Warburton, 1300 Mills St., Menlo Park, Calif. 94025

[21] Appl. No.: 695,062

[22] Filed: Aug. 2, 1996

[51] Int. Cl.$^6$ ...................................................... H05G 1/08
[52] U.S. Cl. .......................... 378/91; 378/53; 250/370.06
[58] Field of Search ................................ 378/45, 53, 83, 378/88, 91; 250/369, 370.06

[56] References Cited

U.S. PATENT DOCUMENTS

| | | | |
|---|---|---|---|
| 3,872,287 | 3/1975 | Koeman | 235/151.31 |
| 4,421,986 | 12/1983 | Friauf et al. | 250/369 |
| 4,658,216 | 4/1987 | Goulding et al. | 328/109 |
| 4,692,626 | 9/1987 | Westphal | 250/389 |
| 4,852,135 | 7/1989 | Anisovich et al. | 378/49 |
| 5,005,146 | 4/1991 | Lakatos et al. | 364/573 |
| 5,349,193 | 9/1994 | Mott et al. | 250/370.06 |
| 5,524,133 | 6/1996 | Neale et al. | 378/53 |

OTHER PUBLICATIONS

Tankahashi, H. et al., "A new pulse height analysis system based on fast ADC digitizing technique," *IEEE Transactions on Nuclear Science*, pp. 626–629, vol. 40, No. 4, aug. 1993.

Georgiev, A. et al., "An analog–to–digital conversion based on a moving window deconvolution," *IEEE Transactions on Nuclear Science*, pp. 1116–1124, vol. 41, No. 4, Aug. 1994.

Al–Haddad, M.N. et al., "Development and testing of a flash analog–to–digital converter based system for pulse shape discrimination of nuclear radiation pulses," *IEEE Transactions on Nuclear Science*, pp. 1765–1769, vol. 41, No. 5, Oct. 1994.

Farrow, R. et al., "X–ray signal processing electronics for solid state detectors," *Rev. Sci. Instrum.*, pp. 2307–2309, vol. 66, No. 2, Feb. 1995.

Jordanov, V.T. et al., "Digital pulse–shape analyzer based on fast sampling of an integrated charge pulse," *IEEE Transactions on Nuclear Science*, pp. 683–687, vol. 42, No. 4, Aug. 1995.

Jordanov, V.T. et al., "Digital techniques for real–time pulse shaping in radiation measurements," *Nuclear Instruments and Methods in Physics Research A* 353, pp. 261–264, (1994) No month.

Mott, R.B. et al., "Improving EDS performance with digital pulse processing," *X–Ray Spectrometry in Electron Beam Instruments*, pp. 1–28 (D.B. Williams et al., New York, Plenum) (1994) No month.

*Primary Examiner*—David P. Porta
*Assistant Examiner*—David Vernon Bruce
*Attorney, Agent, or Firm*—Townsend and Townsend and Crew LLP

[57] ABSTRACT

A high speed, digitally based, signal processing system which accepts directly coupled input data from a detector with a continuous discharge type preamplifier and produces a spectral analysis of the x-rays illuminating the detector. The system's principal elements are an analog signal conditioning section, a combinatorial logic section which implements digital triangular filtering and pileup inspection, and a microprocessor which accepts values captured by the logic section and uses them to compute x-ray energy values. Operating without pole-zero correction, the system achieves high resolution by capturing, in conjunction with each peak value from the digital filter, an associated value of the unfiltered signal, and using this latter signal to correct the former for errors which arise from its local slope terms. This correction greatly reduces both energy resolution degradation and peak centroid shifting in the output spectrum as a function of input count rate. When the noise of this correction is excessive, a modification allows two filtered averages of the signal to be captured and a corrected peak amplitude computed therefrom.

35 Claims, 5 Drawing Sheets

METHOD AND APPARATUS FOR DIGITALLY BASED HIGH SPEED X-RAY SPECTROMETER FOR DIRECT COUPLED USE WITH CONTINUOUS DISCHARGE PREAMPLIFIERS

GOVERNMENT RIGHTS

The U.S. Government has rights in this invention pursuant to Contract No. DE-FG03-92ER81311 awarded by the Department of Energy.

CROSS-REFERENCE TO RELATED APPLICATIONS

This application claims priority from, and is a continuation-in-part of, Provisional Application Ser. No. 60/002,266, filed Aug. 14, 1995, which Provisional Application is hereby incorporated by reference.

The following four commonly-owned copending applications, including this one, are being filed concurrently and the other three are hereby incorporated by reference into this one:

William K. Warburton and Bradley Hubbard, entitled "METHOD AND APPARATUS FOR ANALOG SIGNAL CONDITIONER FOR HIGH SPEED, DIGITAL X-RAY SPECTROMETER" (Attorney Docket 17032-1-1);

William K. Warburton and Bradley Hubbard entitled "METHOD AND APPARATUS FOR DIGITALLY BASED HIGH SPEED X-RAY SPECTROMETER" (Attorney Docket 17032-1-2);

William K. Warburton entitled "METHOD AND APPARATUS FOR DIGITALLY BASED HIGH SPEED X-RAY SPECTROMETER FOR DIRECT COUPLED USE WITH CONTINUOUS DISCHARGE PREAMPLIFIERS" (Attorney Docket 17032-1-3); and William K. Warburton and Carl Zhou entitled "METHOD AND APPARATUS FOR COMBINATORIAL LOGIC SIGNAL PROCESSOR IN DIGITALLY BASED HIGH SPEED X-RAY SPECTROMETER" (Attorney Docket 17032-1-4).

BACKGROUND OF THE INVENTION

The present invention relates generally to systems for digitally processing the pulses generated in detector systems in response to absorbed radiation and, more particularly, to processing such pulses in low cost, high resolution, high rate spectrometers for x-rays or gamma rays when the associated preamplifiers are of the continuous discharge type.

The patent application of Warburton et al. entitled "METHOD AND APPARATUS FOR DIGITALLY BASED HIGH SPEED X-RAY SPECTROMETER" (Attorney Docket 17032-1-2), describes a digitally based, low cost x-ray or gamma ray spectrometer capable of processing extremely high input count rates. This instrument employs an analog signal conditioning unit to reduce the dynamic range of the preamplifier input signal, digitizes the conditioned signal, and then processes it using combinatorial digital logic to detect x-ray pulses, inspect for pileup, implement triangular filtering with a wide range of peaking times, and capture the filtered peak amplitudes for x-ray pulses which are not piled up. The captured peak amplitudes are then passed to a dedicated microprocessor or programmable digital signal processor (DSP), which corrects their amplitudes for various errors and offsets introduced by the logical filtering process and then bins the resultant energy values to produce an output spectrum.

In this same patent application, the corrections which the DSP makes are described in detail for the case of a periodic reset (PR) preamplifier, whose output is essentially a ramp of steps, each step resulting from the absorption of an x-ray in the detector. When employed with a continuous discharge (CD) preamplifier (i.e., a resistor feedback preamplifier), however, the described corrections are inadequate to achieve energy resolution which is comparable to that routinely attained by analog spectrometers.

It would therefore be advantageous if the described digitally based spectrometer could be modified for operation with CD preamplifiers so that its energy resolution was competitive with analog units while still maintaining the counting rate, pileup rejection, cost, volume, and ease of system integration advantages of its predecessor.

SUMMARY OF THE INVENTION

The present invention provides a physically compact, low cost, high speed method and apparatus for processing the pulse signals from a detector-preamplifier system of the continuous discharge (CD) type and providing a complete energy analysis of the radiation impinging on the detector. In specific embodiments, it performs pileup inspection, and has a digital interface so that it can be easily connected to a computer.

The invention employs digital signal processing techniques to analyze the detector-preamplifier input pulses, allowing the high sample rate, low cost analog-to-digital converters (ADCs) and low cost, high speed digital signal processors (DSPs) which are now available commercially for applications in the telecommunications industry to be used to meet the desired performance criteria. The invention is capable of duplicating the energy resolution of state of the art analog x-ray spectrometers working with CD preamplifiers while exceeding their pileup rejection performance. Complete output spectra are produced while operating at the very high count rates which were previously typical only of single channel analyzer (SCA) systems. The use of low cost, high density digital circuitry allows reduction in overall costs by a factor of about 4 and physical volume by a factor of over 10, compared to commercial analog circuitry. The invention implements all spectrometry tuning functions digitally so that they may be handled automatically by an appropriate external computer program.

The invention is an improvement upon the digital spectrometer described in the above-referenced application of Warburton et al. entitled "DIGITALLY BASED HIGH SPEED X-RAY SPECTROMETER, METHOD AND APPARATUS" (Attorney Docket 17032-1-2), which comprises an analog signal conditioning (ASC) subsection, an analog-to-digital converter subsection (ADC), a digital filtering, peak detection, and pileup inspection (FiPPI) subsection implemented in combinatorial logic, and a dedicated programmable digital signal processor (DSP). A complete description may be found in the application. The following synopsis is presented for convenience.

The ASC operates under digital control of the DSP to reduce the dynamic range of the input signal. It includes a function generator, a subtractor, a variable gain amplifier, and a low pass filter. The function generator is adjusted by the DSP to create a replica of the incoming signal. The subtractor subtracts this replica from the input signal, and the variable gain amplifier amplifies the difference to match the input range of the ADC. The low pass filter reduces the bandwidth of the final signal to satisfy the Nyquist criterion for the ADC.

The FiPPI, which accepts the ADC output, is divided into a fast and a slow channel. The slow channel includes a digitally implemented trapezoidal shaping filter, whose peaking time is $\tau_{ps}$, and a buffer to capture peak filter values. The fast channel also digitally implements a trapezoidal filter, whose peaking time $\tau_{pf}$, is much shorter than $\tau_{ps}$. The fast channel then inspects the fast filter output for the arrival of peaks, measures the time between consecutive peaks to determine if pileup will occur in the slow channel, and signals the slow channel buffer to capture the amplitudes of peaks which are not piled up. Additional logic also allows the FiPPI to capture "baseline" values, which are slow filter output values when no peaks are present.

Each time the FiPPI captures a valid slow filter peak value it issues an interrupt command to the DSP, which accepts the value and places it into a memory buffer. Because the DSP can respond to the interrupt in less time than the shortest value of $\tau_{ps}$, no system deadtime is added by this process. Between interrupts the DSP processes the values in the buffer as needed, for example, by converting the captured peak amplitudes into x-ray energy values and binning them to produce a spectrum.

Because the action of the ASC distorts the input signal, the captured slow filtered peak heights are preferably compensated to obtain correct energy values. The DSP accomplishes this in two ways. First, having set the ASC parameters, it can make corrections based on those values and an analysis of the operation of the ASC. Second, by measuring baseline values, it can obtain an estimate of residual errors and errors arising from detector leakage currents and further correct the peak heights for these terms.

In the case of the present invention, the issue is further complicated by the presence of the CD preamplifier, whose output between successive x-ray pulses is a decaying exponential. Since the slope of the decay is proportional to its amplitude and since the "baseline" measured by the trapezoidal filter is essentially a measure of the signal slope, this means that the baseline is not a stable quantity in the CD preamplifier case but varies from instant to instant. Therefore, if correction for this effect is not made on a pulse by pulse basis, considerable smearing of the energy spectrum will result.

The present invention addresses this problem by directly applying the relationship between slope and amplitude noted above. For each peak value captured from the slow filter, a corresponding value of the input signal is also captured. Since the preamplifier and ASC are DC coupled, this amplitude is therefore proportional to the slope and can be easily used to compute a baseline slope correction term for the associated peak value. As a result, both the spectrometer's energy resolution and energy offset become insensitive to incoming count rate.

When the slow filter peaking time $\tau_{ps}$ becomes comparable to the decay time of the CD preamplifier, then the correction term can become a substantial fraction of the total x-ray energy. Under these conditions the method of the previous paragraph becomes noisy because the noise of the single measurement correction term becomes significant compared to the noise of the heavily filtered peak amplitude. To reduce the noise, a more heavily filtered amplitude estimate is used. Since the slow filter output is essentially the difference between filtered amplitude estimates taken before and after the x-ray pulse, the slow filter is modified to output the two filtered amplitudes directly to the DSP, which then uses them to compute both the filter peak amplitude and the baseline correction term with no loss in resolution.

A further understanding of the nature and advantages of the present invention may be realized by reference to the remaining portions of the specification and the drawings.

DESCRIPTION OF SPECIFIC EMBODIMENTS

1. System Overview 1.1. Preamlifier Input Signals

Figure 1A:
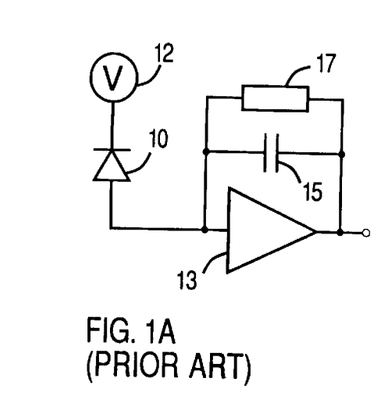
FIG. 1A is a circuit schematic of a representative detector-preamplifier system of continuous discharge type which supplies pulses to the present invention.
Figure 1B:
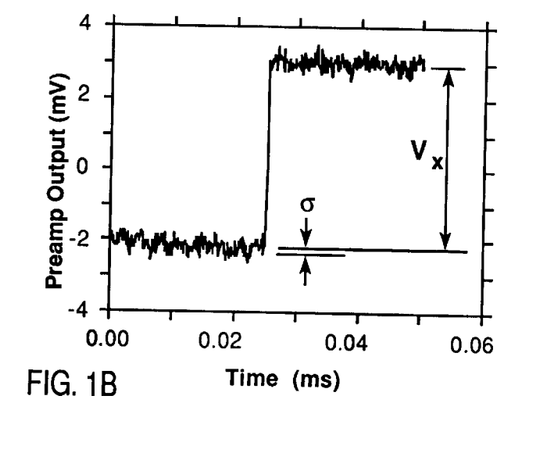
FIG. 1B is the trace of a typical output signal from the detector-preamplifier resulting from the absorption of a single x-ray in the detector.

The description of specific embodiments will be clarified by a brief discussion of the electrical pulses, each corresponding to a detected x-ray, which we intend to process. Such pulses, in the common case of a semiconductor x-ray detector, are generated by a circuit similar to that shown in FIG. 1A. This circuit comprises a semiconductor detector diode 10 reverse biased by a voltage supply 12 and connected to charge integrating preamplifier 13 with a feedback capacitor $C_f$ 15 and a feedback element 17. When diode 10 absorbs an x-ray of energy $E_x$, a charge $Q_x$ equal to $E_x/\epsilon$ is released, where the constant $\epsilon$ is characteristic of the diode semiconductor material. $Q_x$ is integrated on $C_f$ 15 and produces an output voltage step $V_x$ equal to $Q_x/C_f$—such as is shown in FIG. 1B. Obtaining an accurate estimate of $E_x$ therefore requires accurately measuring the voltage step $V_x$ in the presence of the preamplifier's output noise voltage, whose rms value is indicated in FIG. 1B by the value $\sigma$. In the present invention, digital filtering is used to reduce the amplitude of this noise and produce a more accurate estimate of $V_x$.

Figure 1C:
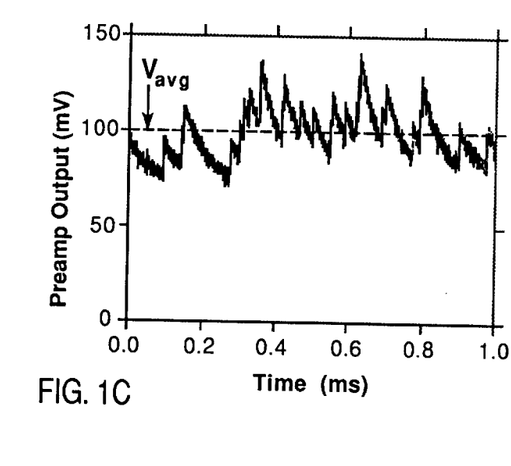
FIG. 1C demonstrates typical outputs from a continuous discharge detector-preamplifier over the course of multiple x-rays.

Functionally speaking, there are two basic types of energy sensitive preamplifiers. Because preamplifier 13 cannot integrate charge indefinitely without exceeding its linear operating range, the feedback element 17 is provided to discharge capacitor 15. In the first basic type, feedback element 17 continuously discharges capacitor 15 (the "CD" case), which is implemented in practice either by using a resistor for feedback element 17 (the classic case) or by other schemes such as forward biasing the JFET input transistor in preamplifier 13. A typical preamplifier output in the CD case is shown in FIG. 1C, and appears as a series of nearly vertical step-like pulses, each corresponding to a step such as shown in FIG. 1B, followed by an exponential decay as feedback element 17 bleeds charge off of capacitor 15. The average output voltage level, $V_{avg}$, results in a discharge current flow through feedback element 17 just equal to $I_{in}$, the input current flow from diode 10. This input current flow includes both leakage current and the current generated by the x-rays absorbed in diode 10. The maximum count rate the preamplifier can handle is set by the maximum value $V_{max}$ to which $V_{avg}$ can rise without fluctuations in the signal exceeding the preamplifier's linear operating range.

Figure 1D:
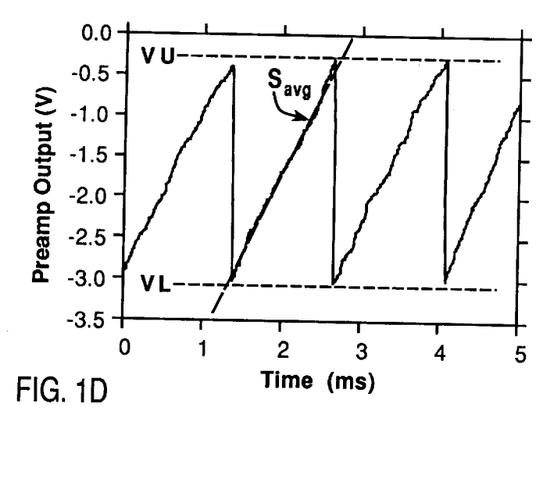
FIG. 1D demonstrates typical outputs from a periodic reset detector-preamplifier over the course of multiple x-rays.
Figure 1E:
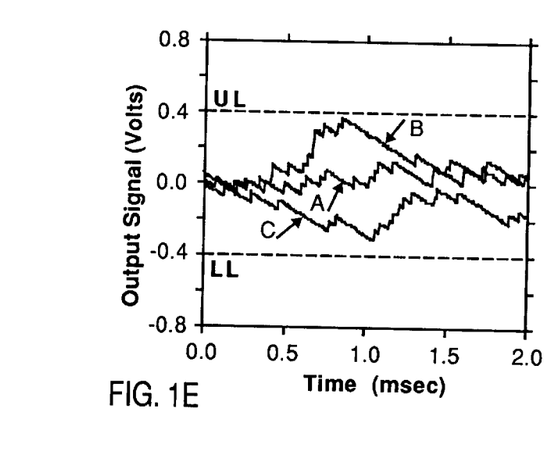
FIG. 1E shows three common x-ray pulse arrival patterns after the ASC has removed the reset-ramp portion of the signal.

In the second basic energy sensitive preamplifier type, feedback element 17 only discharges capacitor 15 at those moments when the output voltage of preamplifier 13 approaches the upper reset value VU which is slightly less than $V_{max}$. Feedback element 17 is essentially a switch, which remains closed until the voltage falls to a preset lower limit VL, when it opens again. This is the periodic reset ("PR") case and may be implemented either with a real transistor switch or by applying a pulse of light to the gate region of preamplifier 13's input JFET. This latter technique is known as pulsed optical feedback ("POF"). FIG. 1D shows a typical output for this case, which consists of a ramp of voltage steps from x-ray pulses which rise to VU, where reset occurs, causing the voltage to return to value VL, whence the process begins anew. Each voltage step has a shape similar to that shown in FIG. 1B and the resultant ramps have an average slope $S_{avg}$ equal to $I_{in}/C_f$. Typical fluctuations of the signal about the ramp are shown in FIG. 1E, where the individual x-ray arrivals are seen as small vertical steps.

The characteristic of exponential decays is that the instantaneous rate of decay is directly proportional to the instantaneous voltage. This may be directly observed in FIG. 1C, where the decaying slopes for events occurring above $V_{avg}$ is greater than the decaying slopes for events occurring below $V_{avg}$. With careful inspection it is also possible to observe the change in decay slope across the events themselves, which derives from the increase in amplitude caused by the event. This behavior is significantly different from that of pulsed optical reset preamplifiers, which are essentially repeated staircases, the height of each step being proportional to the energy of the x-ray which generated it.

1.2. Basic Structure and Function of the Digital Spectrometer

Figure 2:
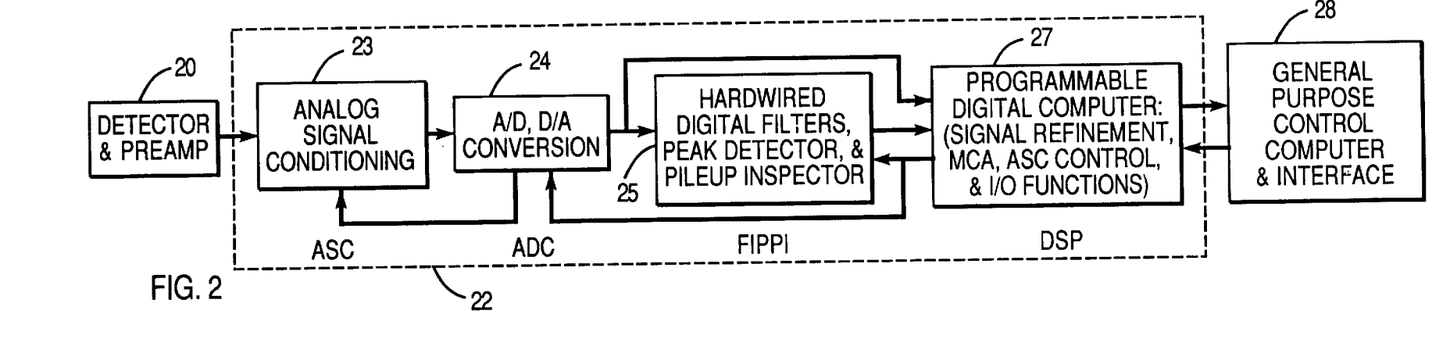
FIG. 2 is a block diagram of circuitry embodying the invention, showing its major parts and its connections to other equipment.

FIG. 2 shows the basic structure of the digital spectrometer, which is described in detail in the above-referenced patent application of Warburton et al. entitled "METHOD AND APPARATUS FOR DIGITALLY BASED HIGH SPEED X-RAY SPECTROMETER" (Attorney Docket 17032-1-2). Input is from a conventional detector-preamplifier 20, such as is represented in FIG. 1A and described above. It feeds into a digital spectrometer 22 comprised of four primary functional blocks: an analog signal conditioning (ASC) block 23; an analog-to-digital converter (ADC) and control digital-to-analog (DAC) block 24; and an digital spectrometer comprising two major functional blocks: a hardwired digital filter, peak detector, and pileup inspector (FiPPI) block 25; and a programmable digital computer block 27, which in a specific embodiment is an embedded digital signal processor (DSP), for signal refinement, multichannel signal analysis, ASC control and input/output (I/O) functions. The digital spectrometer 22 connects to a general purpose control computer and interface 28, from which it receives parameter values to control its operation and to which it sends collected spectra. The functions of block 23 are not required for the operation of the digital spectrometer blocks 25 and 27, but in our preferred embodiment are implemented according to the teachings of the above-referenced application of Warburton et al. entitled "METHOD AND APPARATUS FOR ANALOG SIGNAL CONDITIONER FOR HIGH SPEED, DIGITAL X-RAY SPECTROMETER" (Attorney Docket 17032-1-1). The functions of blocks 25 and 27 can be implemented using various circuitry, but in our preferred embodiment are implemented according to the teachings of the above-referenced application of Warburton et al. entitled "DIGITALLY BASED HIGH SPEED X-RAY SPECTROMETER, METHOD AND APPARATUS" (Attorney Docket 17032-1-2). The general purpose control computer and interface 28 are conventional and may include any of a variety of common personal or laboratory computers and interface standards. The details of interfacing a computer to a DSP are well known to those skilled in the art of digital electronics.

The relations between the functional blocks of the digital spectrometer 22 are also indicated in FIG. 2. The spectrometer receives its input from a detector-preamplifier module 20 and delivers complete x-ray spectra to a general purpose control computer 28. The flow of signals and control within the spectrometer are indicated by the heavy lines connecting the functional blocks. Thus the ASC 23 accepts an analog signal from block 20 and conditions it for analog-to-digital conversion in ADC block 24, which outputs a digital replica of the same signal to the FiPPI 25. Values of this digital signal can also be captured directly by the DSP 27. The DSP 27 sets parameter values for both the ASC 23 and FiPPI 25, to control their operation, the former being first converted into analog signals by ADC block 24. The DSP 27 receives filtered amplitude values captured by the FiPPI 25 and uses them to compute x-ray energy values, which it bins to produce a multichannel spectral analysis (MCA) of the incident x-ray energies. When data collection is complete, DSP 27 sends its collected spectrum to control computer 28. Prior to the start of data collection, such required control parameters as gain, filter shaping times, pileup inspection levels, etc., are downloaded to the DSP 27 from the control computer 28.

1.3. ABC High Level Description

The function of the ASC block 23 it to reduce the dynamic range of the preamplifier's signal so that it can be digitized using a smaller number of bits in the ADC. This is described in above-referenced application of Warburton et al. entitled "METHOD AND APPARATUS FOR ANALOG SIGNAL CONDITIONER FOR HIGH SPEED, DIGITAL X-RAY SPECTROMETER" (Attorney Docket 17032-1-1). In the present case only a brief description will be given so that the function of the invention spectrometer can be understood in proper context.

Figure 3:
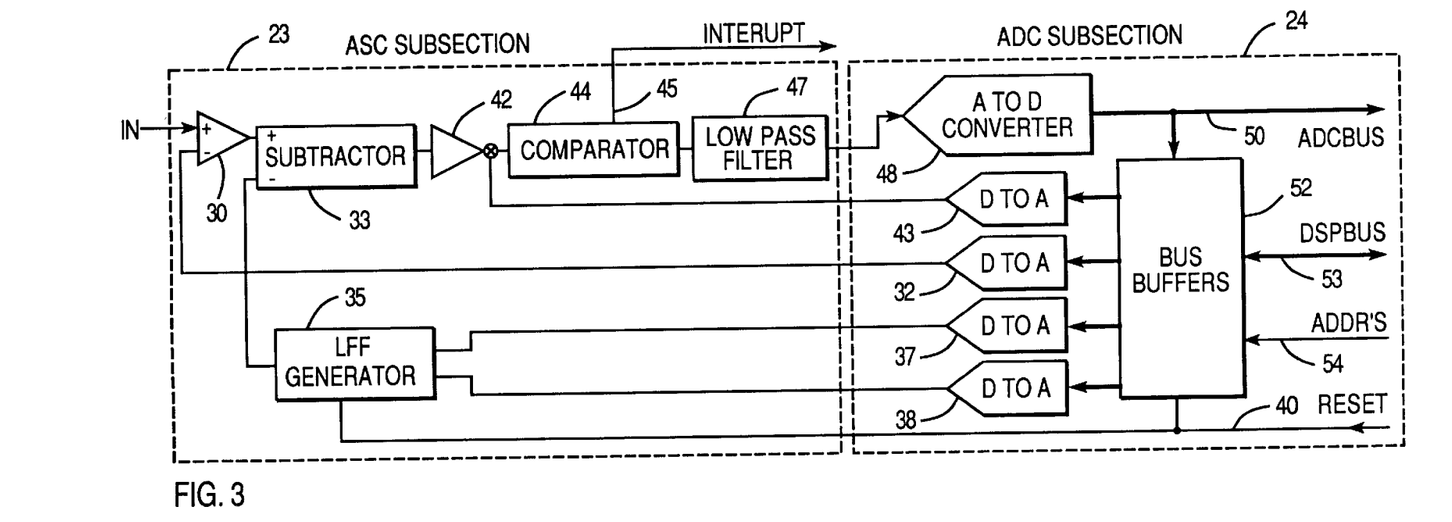
FIG. 3 is a block diagram of the Analog Signal Conditioning and A to D hardware blocks of FIG. 2.

FIG. 3 is a functional block diagram of ASC block 23 and ADC and control DAC block 24. An amplifier 30 accepts an input signal from the detector-preamplifier 20 and amplifies the difference between it and the voltage level set by a digital-to-analog converter (DAC) Bias DAC 32. This allows the preamplifier signal to be centered about zero in the rest of the circuit, allowing maximum gains relative to the fixed amount of amplifier noise. A subtractor 33 subtracts the output of a LFF generator 35 from amplifier 30's output. LFF generator 35's output waveform is controlled by inputs from an Offset DAC 37, a Slope DAC 38, and a reset line 40 directly from the DSP 27. Subtractor 33's output feeds a variable gain amplifier 42, whose gain is controlled a Gain DAC 43. A comparator 44 examines the signal and alerts the DSP 27 on interrupt line 45 if it passes outside the ADC's input limits. A low pass filter 47 removes any signal frequencies above the ADC's Nyquist limit before it reaches an ADC 48.

The ADC output connects both directly to FiPPI block 25 via a digital ADC output bus 50, and indirectly to DSP block 27 via a set of bus buffers 52. The buffers 52 attach to the bidirectional DSP data bus 53, the DSP address lines 54, and the reset line 40. By appropriately loading values onto DSP address lines 54 and writing or reading DSP data bus 53, DSP 27 can load digital input values to the DACs 32, 37, 38, and 43. and sample the ADC output data stream on ADC output bus 50 as desired. Thus it both directly controls all the ASC 23's functions and can also directly measure the effect its actions on the ADC output 50. With appropriate control software, this creates the functionality allowing DSP block 27 first to initially set up preferred operating values for the ASC 23's overall gain and front end offset and then to dynamically control the LFF generator 35's operation as well. The details of using buffers to interface buses and ADCs to a DSP are well known to those skilled in the art of digital electronics and will not be described further.

1.4. ASC Block Output Signal

Under control of the DSP 27, the ASC's LFF generator 35 generates a waveform, consisting a DC offset combined with resetting ramp function, which is then subtracted from the input signal. For a CR preamplifier only a DC offset of value $V_{avg}$ is used (see FIG. 1C). For a PR preamplifier, the DC offset is set to the value VL and the ramp's slope is adjusted to match the average slope $S_{avg}$ (see FIG. 1D). Three samples of the resulting signal, after gain adjustment and Nyquist filtering, are indicated in FIG. 1E (for a PR preamplifier case). The quasi-periodic ramp structure has been removed and the individual x-ray pulses can be seen as vertical steps with fluctuations between their individual arrival times. Trace A shows the average rate of arrival case. Trace B shows a fluctuation in which the count rate temporarily increases and then decreases to return to the average rate. Trace C shows an opposite case of low rate fluctuation followed by a return to average. Further discussion of these fluctuations and the details of setting the ASC gain to accommodate them may be found in the above-referenced application of Warburton et al. entitled "METHOD AND APPARATUS FOR ANALOG SIGNAL CONDITIONER FOR HIGH SPEED, DIGITAL X-RAY SPECTROMETER" (Attorney Docket 17032-1-1). The regions between the steps, which were approximately horizontal at the output of the preamplifier (i.e., as shown in FIG. 1B), are now negatively sloped by the average slope value which was subtracted. The amplitudes of the steps themselves (i.e., $V_x$ in FIG. 1B) are not appreciably modified by this procedure and are to be recovered by the digital spectrometer.

For CR preamplifiers, the ASC output would look much like FIG. 1C, except that the vertical scale would be adjusted to fill the ADC's entire input range. In this case the regions between the x-ray pulses are not linear, but have the same exponentially decaying slopes as the preamplifier, since the latter is DC coupled to the ASC.

Since it will be important to understanding the DSP's spectroscopic correction routines later in the specification, we emphasize that, because both the offset and slope subtracted by the ASC are set by the DSP 27 via DACs 37 and 38, the DSP has full knowledge of these parameters and can use them as required.

1.5. FiPPI: Filter, Peak Detection, and Pileup Inspection Circuit

The FiPPI 25 is implemented in the specific embodiment using combinatorial logic implemented in either a hardwired or re-programmable logic (e.g., FPGA). It is clocked at the same rate as ADC 48, and, accepting digitized signal data on ADC output bus 50, digitally performs the filtering, peak detection, amplitude capture, and pileup inspection functions which are central to the operation of a modern x-ray spectrometer. A complete description of the function and implementation of the FiPPI is given in the above-referenced application of Warburton et al. entitled "METHOD AND APPARATUS FOR COMBINATORIAL LOGIC SIGNAL PROCESSOR IN DIGITALLY BASED HIGH SPEED X-RAY SPECTROMETER" (Attorney Docket 17032-1-4); only an abbreviated version is presented here for the sake of clarity.

Figure 4:
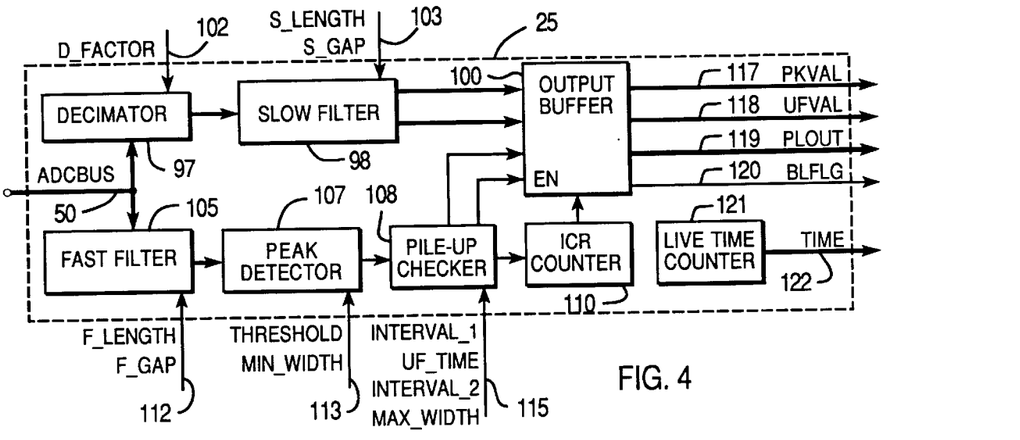
FIG. 4 is a block diagram of the Hardwired Digital Signal Processor hardware block of FIG. 2.

The overall topology of the FiPPI 25 in a specific implementation is indicated in FIG. 4. The digitized pulse stream enters the FiPPI on ADC output bus 50 and feeds into both a slow and a fast signal channel. The first slow channel circuit is a decimator 97, which reduces the incoming signal's data rate by a preset factor. The decimated signal is then processed by a slow filter 98 which digitally implements trapezoidal filtering. The peak maxima in the signal output by the slow filter 98, which correspond to the energies of the detected x-rays, can be captured by an output buffer 100. The operation of the slow channel is controlled by parameters loaded into the FiPPI 25 from the DSP 27. These parameters are a decimation factor 102 and the slow filter's length and gap values 103.

The fast signal channel's principal function is to inspect the data input stream 50 and trigger output buffer 100 to capture appropriate values from the slow filter 98. The fast channel's first circuit is a fast filter 105, which also digitally implements trapezoidal filtering, but with a much shorter time constant than in the slow channel. A peak detector 107 inspects its output for peaks which exceed a preset threshold value for at least a preset number of consecutive samples and then captures the arrival times of these peaks' maxima. These arrival times define the associated x-ray events' arrival times and are used to time the trigger to the output buffer 100. Output pulses from the peak detector are inspected by a pileup checker 108 which rejects events whose maxima would overlap (pile-up) in the slow filter 98. Each time the pileup checker 108 detects a good peak it triggers output buffer 100 to capture the slow filter 98's output value for export to the DSP 27 for further processing. Each peak detector 107 output pulse also increments an input count rate (ICR) counter 110. As in the slow channel, the fast channel's operation is controlled by parameters loaded from the DSP 27. These parameters are: the fast filter length and gap 112, the peak detector's threshold and minimum peak width test values 113, and the interpeak interval, fast peak maximum width, and timing offset values 115 required by the pileup checker.

Each time the output buffer 100 is triggered it also records two other values: the value in the ICR counter 110 and a flag to denote what type of slow filter value was captured. The buffer therefore outputs four values to the DSP 27: two captured slow filter values PKVAL 117 and UFVAL 118, the number of x-rays PLOUT 119 since the last output, and a flag BLFLG 120 indicating whether PKVAL 117 is an x-ray amplitude value or a baseline value for normalization purposes.

The FiPPI's final circuit is a livetime counter 121, which measures the actual time TIME 122 the digital spectrometer spends collecting data. This is useful for two reasons. First, because spectrometer operation is controlled by DSP 27, it may be difficult to precisely time data collection processes started under software control by control computer 28. Second, each spectrometer in a multiple detector system will experience a different data collection history, including differing numbers of preamplifier resets and other events which temporarily interrupt the counting process. Therefore it is important for each spectrometer to be able to accurately measure its own livetime so that count rates can be accurately determined on an absolute basis for each detector in the system.

1.6. Slow Filter

The digital spectrometer presented in the application of Warburton et al. entitled "DIGITALLY BASED HIGH SPEED X-RAY SPECTROMETER, METHOD AND APPARATUS" (Attorney Docket 17032-1-2) produces accurate measurements of x-ray energies via a two step process. First, trapezoidal filtering is carried out in the FiPPI 25 to reduce noise, with a peak amplitude being captured for each non-piled-up pulse. Second, these peak amplitudes are corrected by the DSP 27 to obtain accurate energy measurements. We shall therefore first examine in detail how the trapezoidal filter processes pulses, and then derive corrections for the DSP to apply to extract accurate energy values in the CD preamplifier case.

1.6.1. Theory of Digital Filtering

Figure 5A:
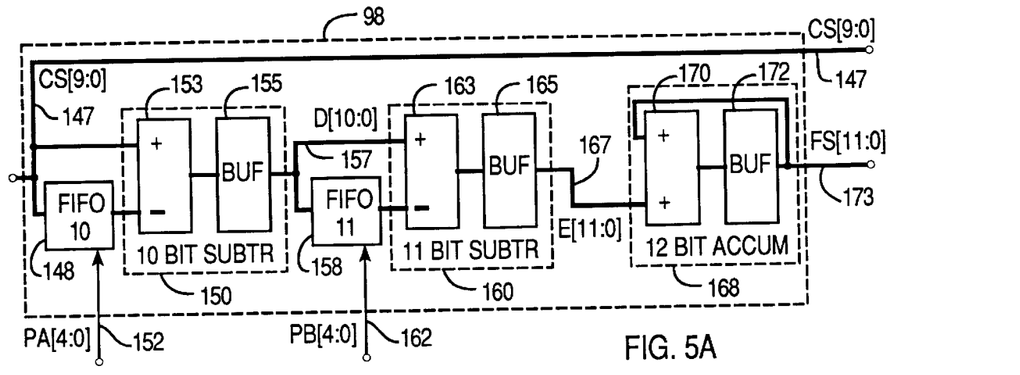
FIG. 5A is a circuit schematic of a representative embodiment of the Slow Filter hardware block of FIG. 4.
Figure 5B:
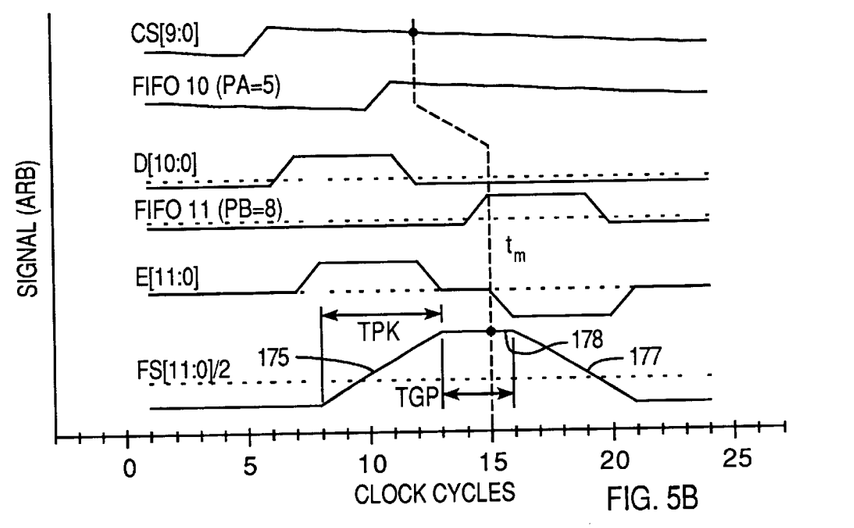
FIG. 5B is a timing diagram illustrating the operation of the circuitry of FIG. 5A.

The implementation of the slow filter module 98 is shown by the block circuit schematics in FIG. 5A and the waveforms in FIG. 5B. In order to describe this module, we first consider trapezoidal filters mathematically.

The trapezoidal filter function values $\{T_i\}$ of a stream of data values $\{d_i\}$ at times $\{i\}$ are given by the equation $$T_i = -\sum_{k=i-2L-G+1}^{i-L-G} d_k + \sum_{k=i-L+1}^{i} \quad (1)$$

Here L and G are the slow filter interval length $L_s$ and gap interval $G_s$ and enter the module as the set of parameters 103 which describe the filter. When the $G_s$ is zero, the trapezoidal filter becomes the more commonly used triangular filter function. Both forms of shaping filter have been extensively discussed in the analog spectrometer literature. The trapezoidal function has the benefit that its amplitude is independent of charge collection time in the detector if the gap $G_s$ is made adequately long, thus avoiding the phenomenon of ballistic deficit. On the other hand, its signal to noise ratio for short shaping times is not as good as that of the triangular function. In the present case the selection is completely under the control of the experimentalist who sets the control parameters S_Length and S_Gap 103. Triangular filtering provides theoretically optimum signal to noise in the limit of white series noise, which is the case encountered when using short shaping times to process pulses at very high data rates. These issues are well understood by those skilled in the field of detector signal processing. The point of primary importance is that, among non-adaptive shaping filters, the triangular shape gives optimum performance at high data rates and it can be obtained from the difference between two sums, as per Eqn. 1.

Eqn. 1, however, is not preferred from an implementation viewpoint because it requires both temporary storage for summing the most recent $2L_s+G_s$ data points and also the implementation of adders with enough bits to handle the resultant sums. For long filter times, such adders not only consume excessive FPGA real estate but they also operate slowly, limiting the FiPPI's achievable speed. Instead, Eqn. 1 can be recast in the recursive form:

$$T_i = T_{i-1} + d_i - d_{i-L} - d_{i-L-G} + d_{i-2L-G}. \quad (2)$$

Further, noting that the partial sum $(d_{i-L-G} + d_{i-2L-G})$ is just the partial sum $(d_i - d_{i-L})$ evaluated $L_s + G_s$ timesteps earlier, we discover that it is possible to create $T_i$ according to Eqn. 4 using only two first-in-first-out (FIFO) memories: one $C_W$-bits wide by $L_s$ bits deep to hold $L_s$ values for making the partial sums $(d_i - d_{i-L})$ and one $C_W + 1$ bits wide by $L_s + G_s$ bits deep to hold enough partial sum values to implement Eqn.4 (where $C_W$ is the bit width of the decimator output CS[9:0] 147 and equals 10 in the specific embodiment).

1.6.2. Slow Filter Specific Implementation

FIG. 5A is a circuit schematic of a specific slow filter 98 that $T_i$ values according to Eqn. 4 for a 10 bit input. FIG. 5B shows representative waveforms during its operation, at one time step i per clock cycle, with dotted lines showing zero signal levels. The width of all the components in the filter (FIFOs, etc.) would expand by 1 bit for each bit of decimation. Its input CS[9:0] 147, from the decimator 97, is shown with a slight slope both before and after a typical pulse to represent the effects of detector leakage current or the operation of the ASC 23. CS[9:0] 147 is applied both to a 10 bit wide FIFO memory 148 and directly to the positive input of a 10-bit subtractor 150, the output of FIFO 148 being applied to its negative input. The depth of FIFO 148 is set by the 5 bit parameter PA[4:0] 152 which corresponds to the filter length Ls in Eqn. 4. Its output is just C[9:0] delayed by PA time steps. The subtracter 150 comprises an asynchronous subtracter 153 and an asynchronizing output buffer 155. Its 11 bit (10 bits plus sign) output D[10:0] 157 corresponds to the sequence of partial sums $(d_i - d_{i-L})$ and is fed into an 11 bit FIFO 158 and an 11 bit subtracter 160. The depth of FIFO 158 is set by the 5 bit parameter PB[4:0] 162, which corresponds to $L_s + G_s$ in Eqn. 4 and is obtained from the slow filter input parameters 103. The output of FIFO 158 is just D[10:0] delayed by PB time steps. The subtracter 160 consists of an 11 bit asynchronous subtracter 163 and a synchronizing buffer 165. Its 12 bit (11 bits plus sign) output E[11:0] 167 is a sequence of the partial sum difference $[(d_i - d_{i-L}) - (d_{i-L-G} - d_{i-2L-G})]$ in Eqn. 2. The running sum of Eqn.2 is found by feeding E[11:0] 167 to a 12 bit accumulator 168 consisting of an asynchronous 12 bit adder 170 and a synchronizing buffer 172 with the buffer output fed back to one of the adder inputs. Its 12 bit output FS[11:0] 173 is the sequence of values $T_i$ in Eqn. 2.

For a given x-ray absorption event (a step function in C[9:0]) F[11:0] is a trapezoidal pulse whose rising edge 175 and falling edge 177 are both equal to TPK, the "peaking time", which is equal to $L_s$ and controlled by the parameter PA 152. Its flattop 178 has duration TGP, the "gap time," which equals $G_s$ and equals the difference between parameters PA 152 and PB 162. Both PA and PB are downloaded to the FiPPI via the parameters S_Length and S_Gap 103 from the DSP 27 before operation begins and therefore can be set by the experimentalist through the general purpose control computer 28. The black dot on trace FS[11:0] in FIG. 5B shows the time $t_m$ when the pileup checker captures FS[11:0] to output buffer 100 if the peak is not piled-up. When CS[9:0] is also to be captured, this must happen TGP clock cycles earlier to account for the delays in subtractors 150 and 160 and accumulator 168.

An important feature about the output FS[11:0] 173 is that its baseline is non-zero, the amplitude of the effect being proportional to the slope in the signal CS[9:0]147. This has two major consequences. First, peak amplitudes are only meaningful if measured with respect to the baseline, which therefore means that the baseline must also be determined accurately for accurate x-ray energies to be extracted. Second, if the slope in CS[9:0] is not constant (as in the output of a CD preamplifier, where the signal slope between x-rays pulses decays exponentially), then the baseline will also vary in time and, in fact, will have to be measured locally for each detected x-ray pulse. This lack of a constant, well defined baseline value means that, without modification, the baseline determination strategy adopted in the above-referenced patent application of Warburton et al. entitled "DIGITALLY BASED HIGH SPEED X-RAY SPECTROMETER, METHOD AND APPARATUS" (Attorney Docket 17032-1-2) will not function as effectively in the CD preamplifier case as it does in the PR preamplifier case.

Figure 6:
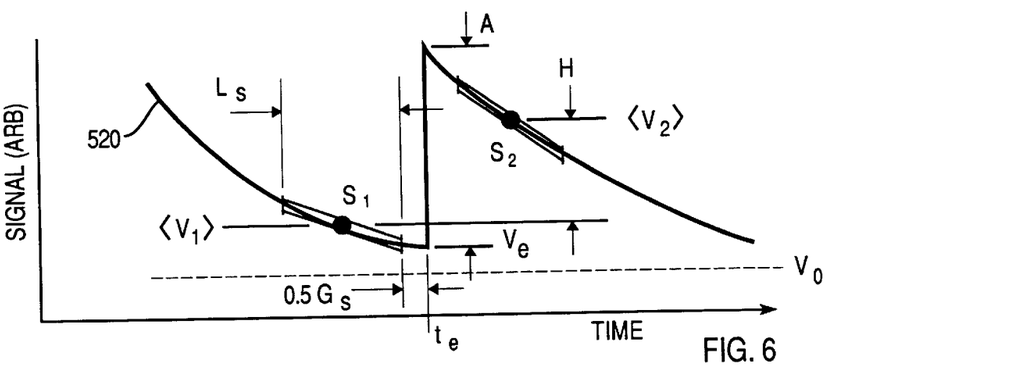
FIG. 6 is a sketch defining the terms used in the derivation of the pulse height correction term for the continuous discharge type preamplifier.

2. Correcting the Slow Filter Output for Exponential Slope
2.1. Mathematical Derivation of the Correction FIG. 6 shows a schematic view of an x-ray pulse in the signal CS[9:0] 147, with exponential decays preceding and following the signal step which carries the x-ray's energy information. The desired information is the amplitude A, but what is measured by the trapezoidal filter is the value H, which is the difference between the two running average values $<V_2>$, captured $0.5(L_s+G_s)$ after the pulse, and $<V_1>$, captured $0.5(L_s+G_s)$ before the pulse. Here $L_s$ and $G_s$ are the filter peaking and gap times respectively. For reference, the slopes of the signal at the two measurement points are noted $S_2$ and $S_1$, respectively. The value of the signal at time $t_e$ instantaneously before the x-ray event is denoted $V_e$, and the value to which the signal decays exponentially is $V_0$. Nominally, $V_0$ would correspond to zero volts at the preamplifier but, because of unintentional offsets and the action of the ASC 23, it may have some finite, non-zero value in the signal CS[9:0]. We will include it in the following derivations with the understanding that it can be dropped from the equations when it is negligible.

In the following, it will be useful to define the constant K by the relation $K=(L_s+G_s)/2\tau$, where $\tau$ is the exponential decay time of the preamplifier.

We can now write equations to describe the exponential decays:
for $t<t_e$:

$$V=V_0+(V_e-V_0) \exp((t_e-t)/\tau)$$

for $t>t_e$:

$$V=V_0+(V_e+A-V_0) \exp(-(t-t_e)/\tau) \qquad (3)$$

from which we can obtain formulae for the slopes $S_1$ and $S_2$, which are proportional to the instantaneous amplitudes, as:

$$S_1=-(V_e-V_0)\tau^{-1}\exp((L_s+G_s)/(2\tau))=-(V_1-V_0)\tau^{-1}$$

$$S_2=-(V_e+A-V_0)\tau^{-1}\exp(-(L_s+G_s)/(2\tau))=-(V_2-V_0)\tau^{-1} \qquad (4)$$

We can mathematically express the trapezoidal filter output H in terms of the pulse amplitude A and the local slope values $S_2$ and $S_1$, to first order, by:

$$H=A+(S_2+S_1)(L_s+G_s)/2=A+(S_2+S_1)K\tau \qquad (5)$$

where we are approximating the difference between the two average values ($<V_2>$ and $<V_1>$) by their time interval separations $(L_s+G_s)/2$ from $V_e$ multiplied by the average slopes over the corresponding measurement regions, and we see that K depends on these time intervals.

We next solve Eqn. 4 self consistently for the slopes $S_1$ and $S_2$, using the same approximation:

$$\tau S_1=-(V_1-V_0)=-(V_e-S_1\tau K-V_0),$$

or $$S_1=(V_e-V_0)/(\tau(1-K)) \qquad (6)$$

and similarly:

$$S_2=-(V_e+A-V_0)/(\tau(1+K))$$

These values can be substituted into Eqn. 5 and reduced to obtain:

$$A=H(1+K)+2K(V_e-V_0)/(1-K) \qquad (7)$$

where neither $V_e$ nor $V_0$ is a measured variable. We can obtain an estimate for $V_e$ by measuring the instantaneous voltage at any point. For reasons of mathematical simplicity, we choose the point $V_2$, at time $(L_s+G_s)/2$, which is midway along the second running average. We can write an expression for this value in terms of $V_e$ as:

$$V_2=(V_e+A-S_2\tau K)=V_e+A-(V_e+A-V_0)K/(1+K) \qquad (8)$$

so $$V_e=(1+K)V_2-A-KV_0 \qquad (9)$$

This expression can be substituted into Eqn. 7 and the result solved for A to obtain the desired results:

$$A=H(1-K)+2KV_2-2KV_0 \qquad (10)$$

where H and $V_2$ are measured quantities and $V_0$ is nominally a constant which can be dropped when it is negligible. Thus the compensated amplitude A is found by combining the filtered signal H, weighted by the constant $(1-K)$ with the input signal value $V_2$, weighted by the constant $2K$. When $V_0$ is non-negligible it can be included as well, weighted by the constant $-2K$. The value A can be scaled to obtain the x-ray energy by multiplying by the system gain G, just as in Eqn. 6 of the patent application by Warburton et al. entitled "METHOD AND APPARATUS FOR DIGITALLY BASED HIGH SPEED X-RAY SPECTROMETER" (Attorney Docket 17032-1-2). Estimates of $2KV_0$ can be obtained by measuring values of A when no x-ray is present. Thus the term $2KV_0$ plays exactly the same role in computing A values as the baseline B did in the referenced Eqn. 6 and the same algorithms can be used to obtain an accurate estimate of its value. Any linear slope terms arising from detector leakage current will also fall into this term.

$V_0$ can be determined from measurements made when no x-ray pulse is present. Under this condition, the value of A is zero in Eqn. 7, which can be solved for $V_0$ as $$V_0=H(1+K)(1-K)/2K+V_e \qquad (11)$$

When $V_e$ is then determined from $V_2$, as in Eqn. 9, and substituted into Eqn. 11, we obtain $$V_0=H(1-K)/2K+V_2, \qquad (12)$$

which is the same as solving Eqn.10 directly for $V_0$. Since each individual independent $v_0$ measurement of $V_0$ will have the same statistical noise as measurements of A, some kind of averaging technique, such as the running averaging technique presented in the patent application by Warburton et al. entitled "METHOD AND APPARATUS FOR DIGITALLY BASED HIGH SPEED X-RAY SPECTROMETER" (Attorney Docket 17032-1-2), will be required to accurately estimate the mean value $<V_0>$ of $V_0$ for use in Eqn. 10.

To recapitulate this section: in order to accurately measure the amplitude of an x-ray from a CD preamplifier, we need three terms. These are: 1) an accurate estimate of the "baseline" $-2KV_0$; 2) the output H of the slow filter captured at its peak, which occurs at the time $(L_s+G_s)/2$ after it starts to rise; and 3) an estimate of the unfiltered voltage CS[9:0] at the same relative time. The actual capture times of the two terms will be different due to clocking delays through the slow filter as noted in the discussion of FIG. 5B above.

2.2. Physical Implementation of the Correction

While Eqn. 10 could be implemented using analog circuitry, so that A would be a continuous function of H and $V_2$, our preferred embodiment uses only discrete measurements of these signals, employing the same physical hardware as described in the above-referenced application of Warburton et al. entitled "METHOD AND APPARATUS FOR COMBINATORIAL LOGIC SIGNAL PROCESSOR IN DIGITALLY BASED HIGH SPEED X-RAY SPECTROMETER" (Attorney Docket 17032-1-4). All that is required is to set the value of UF_Time 115 to an appropriate value so that the unfiltered value $V_2$ (i.e., CS[9:0]) is captured at an appropriate instant corresponding to H (i.e., FS[11:0]). We note that the output of the trapezoidal shaping filter occurs at a time interval of $L_s+G_s/2$ after the step, while $V_2$ is to be captured at a time interval of $(L_s+G_s)/2$ after the step. Thus $V_2$ should be captured at $L_s/2$ before the filter output appears, corrected, of course, for delays in the shaping filter. The standard slow filter, as shown in FIG. 5A has a delay of 3 decimated clock cycles between its inputs and outputs. Since the FiPPI uses the fast clock for timing, CS[9:0] 147 should be sampled $(3+L_s/2)D$ fast clock cycles before FS[11:0] 173, where D is the decimation factor between fast and slow channels.

Implementation of the CD preamplifier correction, in this model, therefore occurs primarily in the code implemented in the DSP 27. In the case of the PR preamplifier described in the patent application noted above, the determination of x-ray energy is carried out using the Eqn. 9, presented there, which is $$E=G[PKVAL+S_B(L_s+G_s)-B] \quad (13)$$

where $S_B$ is the slope value set in the ASC analog section 23 and B is the current value of the running baseline average. In the CD preamplifier case, $S_B$ is always zero and instead we use the value of UFVAL (CS[9:0]) 118, which is not used in the PR preamplifier case. Thus the code implements:

$$E=G[(1-K)PKVAL+2K(UFVAL-<V_0>)] \quad (14)$$

where individual values of $V_0$ are determined from baseline measurements (A=0) according to the relationship $$V_0=[(1-K)PKVAL/(2K)+UFVAL]_{A=0} \quad (15)$$

and the averaged value $<V_0>$ can be computed by various methods, including the exponentially decaying algorithm presented in the above-referenced patent application.

2.3. Noise Performance of the Correction

We can now inquire how much extra noise will be introduced into the energy values computed according to Eqn. 14, compared to the noise expected from measurements of PKVAL alone. Making an accurate computation of the two noise terms is difficult, both because UFVAL is actually one of the terms in PKVAL, and also because successive noise terms in PKVAL are not uncorrelated, since the low pass filter 47 in the ASC 23 has cut off all frequencies below one half the sampling frequency. To estimate the amplitude of the correction term's noise to that of PKVAL itself, however, we will ignore this fact and proceed as if successive data values from the ADC 48 are uncorrelated.

We therefore assume that each measured value from the ADC 48 on the ADC output bus 50 has some noise standard deviation σ. After decimation by D, the relative noise is $\sigma/\sqrt{D}$, which is the noise of $V_2$. If the slow filter length is $L_s$, then its relative noise, which is the noise of PKVAL, can be approximated by $\sigma_{sf}\sigma/\sqrt{D L_s/2}$, the factor of 2 arising because the output of the slow filter is the difference of two sums of $L_s$ values. For this exercise, we assume that $<V_0>$ is accurately determined. The ratio N of the noise of the correction term 2K UFVAL to that of PKVAL is then given by $$N = \sigma_{UFVAL}/\sigma_{PKVAL} \quad (16)$$
$$= (2K\sigma/D_{1/2})/(\sigma/(DL_s/2)^{1/2})$$
$$= K(2L_s)^{1/2}$$

We can now estimate N for several cases involving the typical CD preamplifier, for which the decay time τ is about 50 μs. For a peaking time of 4 μs, which will typically be implemented with a decimation factor of 4, TPK=4 μs, and TGP typically=0.6 μs, which result in K=0.046 and $L_s$=20, giving N=0.291. This number, added in quadrature with unity corresponds to a noise increase of about 4% (i.e., 150 eV resolution degrades to 156 eV). Such a loss of resolution is probably tolerable, given that CD preamplifiers do not usually achieve this sort of resolution anyway. For high speed applications, where peaking times are even shorter, the correction rapidly becomes negligible.

For peaking times of order 20 μs, however, the situation is much degraded. Here TPK=20 μs, which will typically be implemented with a decimation factor of 16, so TGP will typically be about 2.4 μs. Thus K will be 0.224, $L_s$=25, and N=1.54. This number, added in quadrature with unity, corresponds to a noise increase of 87% (i.e., 150 eV resolution degrades to 280 eV) which is much less useful in most applications. The problem arises because only a single value, which is therefore relatively noisy, is used to correct an average of many values under circumstances where its weighting factor is relatively high. The concept of making the correction remains valid, but for this type of application it is necessary to obtain an estimate of $V_2$ which is statistically less noisy, compared to PKVAL. One approach to reducing the noise in $V_2$ would be to apply a different, separate filter to the input signal prior to capturing its value as $V_2$. A superior approach, and our preferred implementation, is presented in the next section.

3. Alternate Correction for Long Shaping Times 3.1. Mathematical Derivation

In the preceding derivation, the primary measured value was H and an additional measurement of $V_2$ was made to correct it but, for long shaping times the accuracy of a single $V_2$ measurement becomes limiting. If, instead, we recognize that the most accurate measurement of $V_2$ we can make is its running average $<V_2>$ and combine this with the fact that the trapezoidal filter output H is just the difference of two running averages $<V_2>-<V_1>$, then we can derive the correction as follows.

We begin by substituting expressions for $S_2$ and $S_1$ from Eqn. 4 into Eqn. 5 for H, noting that $H=<V_2>-<V_1>$:

$$H=A-K(V_2+V_1)+2KV_0=<V_2>-<V_1> \quad (17)$$

We then replace both $V_2$ and $V_1$ by our average estimates for their values, $<V_2>$ and $<V_1>$, and rearrange terms to obtain:

$$A=<V_2>(K+1)-<V_1>(K-1)-2KV_0 \quad (18)$$

as a replacement for Eqn. 10, wherein all terms now have as much statistical accuracy as possible, and the $V_0$ term can be ignored when $V_0$ is negligible. The two primary terms in Eqn. 18 are thus the running averages $<V_2>$ and $<V_1>$ weighted by the constants (K+1) and (K−1). As may be seen from FIG. 6, and the implementation of the next section makes explicit, $<V_2>$ and $<V_1>$ are simply the same filter function (here a running average of L points) separated in time by an interval $\Delta$ (here L+G). The same approach can be used with other noise filters than the running average filter.

3.2. Physical Implementation

Figure 7A:
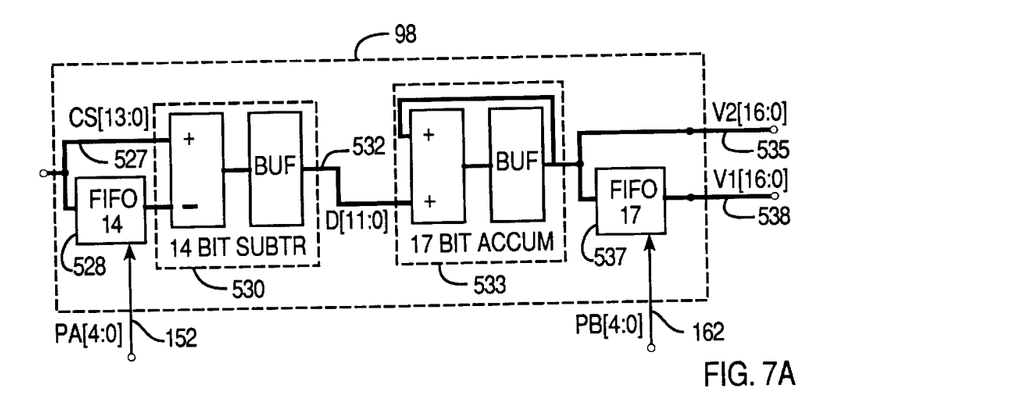
FIG. 7A is a circuit schematic of an alternate embodiment of the Slow Filter hardware block of FIG. 4.
Figure 7B:
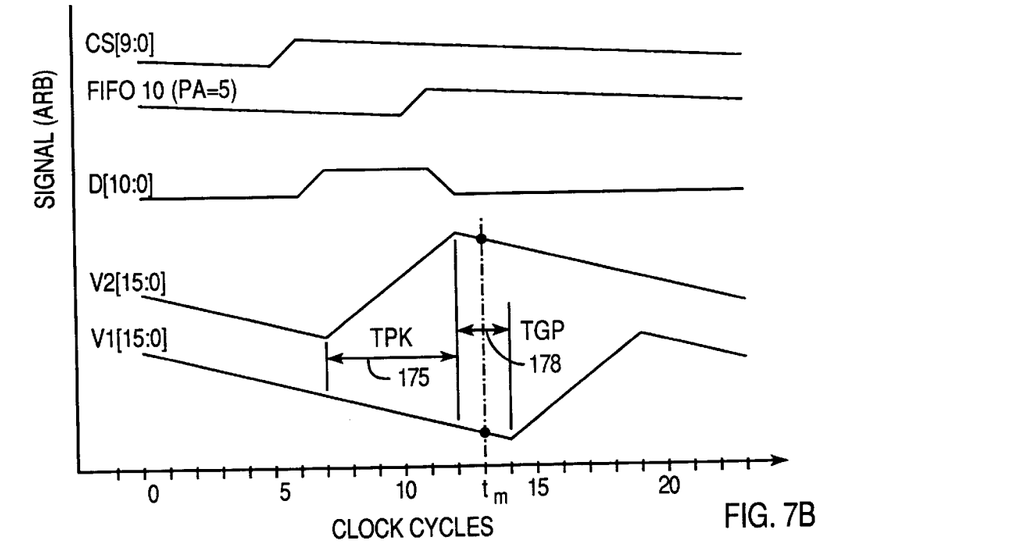
FIG. 7B is a timing diagram illustrating the operation of the circuitry of FIG. 7A.

In the original implementation of the FiPPI, neither $<V_2>$ nor $<V_1>$ is either directly available nor computed as an intermediate term. To achieve the result of Eqn. 18, a different implementation of the slow filter 98 is required. Such an implementation is shown in FIG. 7A, with its timing diagram and output signals shown in FIG. 7B. This case may be compared to FIGS. 5A and 5B. First, since decimation by 4 bits will typically be required for the long shaping times of interest, the input signal CS[13:0] 527 is now 14 bits wide, as is the first FIFO 528. CS[13:0] 527 feeds to the positive input and, via FIFO 528, to the negative input of a 14 bit subtractor 530. The FIFO length is controlled by the parameter PA[4:0] 152 which is set to $L_s$, so that the output of the subtractor 530 at time i+1 is $D[11:0]_{i+1}=CS_i-CS_{i-L}s$. Only 12 bits are reserved for the difference on the assumption that no x-ray pulse will exceed ⅛ of the preamplifier's input range. When this assumption is not true, the number of bits in D and following stages may be increased appropriately. D[11:0] 532 is then fed into one input of a 17 bit accumulator 533, whose other input is its own output. The output of the accumulator 533 at time t+2, $V2[16:0]_{t+2}$ 535 is therefore the running sum of CS between i and i−$L_s$ (i.e., $<V_2>$). This is fed into a 17 bit FIFO 537, whose output $V1[16:0]_{t+2}$ 538 delays this by the parameter PB[4:0] 162, which is equal to $L_s+G_s$. V1[16:0] 167, is therefore $<V_1>$. These values are captured in the output buffer 100 by the action of the Pile-up Checker 108, exactly as described above, with V2[16:01] 535 being output as PKVAL 117 and V1[16:0] 538 being output as UFVAL 118.

Once the values of $<V_2>$ and $<V_1>$ have been transferred to the DSP 27, it can compute the x-ray's energy according to $$E=G(K+1)<V_2>-G(K-1)<V_1>-2GKV_0 \quad (19)$$

where the terms G(K+1), G(K−1) and 2GK can all be stored as single constants and $V_0$ treated as described earlier.

Since the statistical noise in both $<V_2>$ and $<V_1>$ is approximately $\sigma/\sqrt{DL_s}$, the noise in A, from Eqn. 18, will then be approximately $\sigma/\sqrt{2DL_s}$, which is the same as the noise in H. Eqn. 18, therefore, essentially preserves the full statistical accuracy of the energy measurement independent of peaking time.

It is important to note that, because the entire FiPPI is commonly implemented in a field programmable gate array (FPGA), choosing between the implementations represented by Eqns.10 and 18 need not involve any change in the physical parts in the spectrometer or in their layout but only changes to the download file to the FPGA and to the software in the DSP 27, which computes the x-ray's energy according to either Eqn.14 or 19.

4. Implementation Using Analog Spectrometer Electronics

It is also important to note that the Eqns. 10, 14, 18, and 19 are derived based solely on the nature of decaying exponential curves and not on the fact that, in the presented implementation, their terms were computed by digital means. The equations can, in fact, also be implemented by analog means. Thus, for example, if a CD preamplifier were DC coupled to an analog spectroscopy amplifier with triangular shaping and baseline correction, then, in Eqn. 10, the term H could be replaced by the output of an analog triangular filter, the value $V_2$ replaced by an appropriately time delayed copy of the input signal, and the resultant output signal would be corrected for instantaneous baseline shifts resulting from the exponentially decaying signal. Thus, this technique eliminates the need for pole-zero compensation which is required in AC coupled systems.

Figure 8:
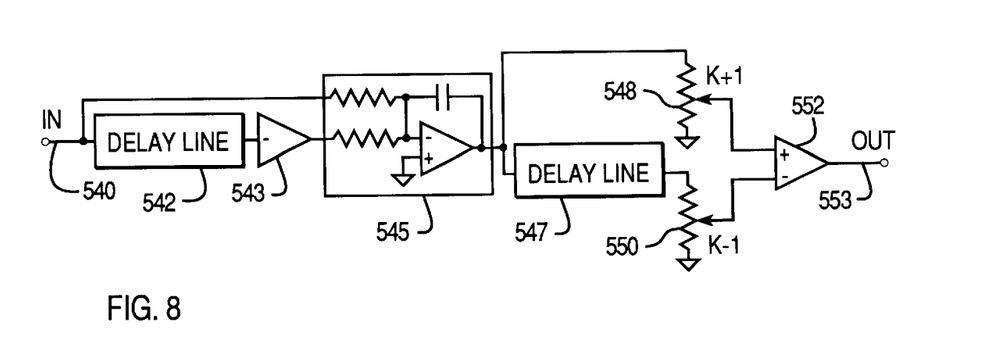
FIG. 8 shows an analog filtering technique.

Eqn. 18 can also be implemented using analog filtering techniques, as schematically indicated in FIG. 8. What is required is to take a weighted difference between a filtered signal ($<v_2>$) and a time delayed copy of the same filtered signal ($<V_1>$). Thus, the input signal 540 is fed directly and via a delay line 542 with inverter 543 into an integrator 545, which produces the running average $<V_2>$. This signal is delayed a delay line 547 to form the signal $<V_1>$. These two signals pass through dividers 548 and 550, which apply the weighting factors K+1 and K−1, into a difference amplifier 552 whose output 553 then corresponds to the terms (K+1) $<V_2>+(K-1)<V_1$ in Eqn. 18. The correction for $V_0$ would be supplied in practice by adding a baseline restoration circuit to the output of the circuit, as is well known to those skilled in the art. This circuit may offer substantial advantages over existing approaches when high input rates and short shaping times are desired, particularly within the time regimes where analog delay lines are easily implemented.

5. Conclusion

In conclusion it can be seen that the present invention recognizes and addresses certain complications introduced by the use of a CD preamplifier, whose output between successive x-ray pulses is a decaying exponential. The invention is able to address the problem by exploiting the fact that the slope of the decay is proportional to its amplitude. As a result, both the spectrometer's energy resolution and energy offset become insensitive to incoming count rate.

While the above is a complete description of specific embodiments of the invention, various modifications, alternative constructions, and equivalents may be used. Thus, while the primary implementation described in the specification was digitally based, the two analog implementations presented were readily devised once the basic concept was understood. Therefore, the above description should not be taken as limiting the scope of the invention as defined by the appended claims.

What is claimed is:

1. A method for applying a shaping filter, described by a set of one or more parameters, to a noisy input signal containing step-like pulses with exponential decays, described by a time constant τ, between them to extract estimates of the step amplitudes of said pulses which are substantially independent of the slope values of the exponentially decaying components in the vicinity of the pulses, by the steps of:

applying said shaping filter to said input signal to generate a filtered signal;

generating a first weighted signal by weighting said filtered signal by a first constant that depends upon the values of the set of shaping filter parameters and upon τ;

generating a second weighted signal by weighting said input signal by a second constant that depends upon the values of the set of shaping filter parameters and upon τ; and forming a compensated signal by combining the first and second weighted signals, the compensated signal representing the filtered signal compensated for the exponentially decaying components' slope values in the vicinity of said step-like pulses.

2. The method of claim 1 wherein the first and second constants are determined for a particular shaping filter by the steps of:
   mathematically expressing said filter's output amplitude in terms of said step-like pulse's amplitude and the exponentially decaying components' slope values in the vicinity of said step-like pulses;
   using the proportionality between the slope of a decaying exponential and its instantaneous amplitude to express said slopes in terms of said input signal amplitudes; and
   solving for the pulse step amplitude in terms of the filter's output amplitude and the input signal's amplitude.

3. The method of claim 1 and further comprising the step, performed before said step of generating a second weighted signal, of applying a different filter to the input signal, so that said second weighted signal includes the effect of said different filter.

4. The method of claim 1 wherein only discrete measurements of said input and filtered signals are used to produce each step-like pulse amplitude estimate, by the additional steps, prior to said steps of generating first and second weighted signals, of:
   capturing said filtered signal at an instant which is separated from the occurrence of the step-like pulse by a first time interval;
   capturing said input signal at an instant which is separated from the occurrence of the step-like pulse by a second time interval; and
   including the values of said first and second time intervals in determining the values of said first and second weighting constants; and
   replacing said filtered and input signals by said captured values of the same in all subsequent steps in the method.

5. The method of claim 4 wherein said capturing steps are carried out only for those step-like pulses in the input signal which meet one or more validity criteria.

6. The method of claim 5 where one of the validity criteria is that the pulse is not piled up.

7. The method of claim 1 wherein the input signal is the output of a continuous discharge type preamplifier whose input is an x-ray or γ-ray detector; and
   the amplitudes of the steps represent the energies of the x-rays or γ-rays absorbed in the detector.

8. The method of claim 4 wherein:
   the captured shaping filter value is denoted by $H$;
   the captured input signal value is denoted by $V_2$;
   the value of the input signal instantaneously before the step is denoted by $V_e$;
   the corrected amplitude estimate is denoted by $A$; and
   $A$ is obtained from $H$ and $V_e$ according to the formula $$A = H(1+K) + 2KV_e/(1-K),$$

where $K$ is a constant depending upon the values of the exponential decay constant $\tau$, the parameters describing the shaping filter, and the values of the first and second time intervals; and
   $V_e$ is calculated from the value of $V_2$.

9. The method of claim 8 wherein:
   the shaping filter is a trapezoidal filter having a peaking time $L$ and a flattop time $G$;
   the exponential decay time is denoted by $\tau$;
   and $K$ is given by the expression $K = (L+G)/2\tau$.

10. The method of claim 9 wherein:
    the first time interval is $L+G/2$; and
    the second time interval is $(L+G)/2$;
    so that $V_e$ is related to $V_2$ according to the formula $$V_e = (1+K)V_2 - A;$$

and
    $A$ is computed according the formula $A = H(1-K) + 2KV_2$;
    $(1-K)$ being said first weighting constant and $2K$ being said second weighting constant.

11. The method of claim 4 wherein the estimate of the step amplitude is further corrected for errors which arise when $V_0$, the asymptotic value toward which said input signal exponentially decays, is non-zero, by the additional steps of:
    capturing values of the shaping filter output and associated values of the input signal at instants when no step pulse is being filtered;
    using these captured values to compute an independent measure $v_0$ of said non-zero asymptotic value $V_0$;
    using one or more independent measures $v_0$ to estimate the mean value $<V_0>$ of the asymptotic value $V_0$; and
    using this mean estimated value $<V_0>$ to make said further correction.

12. The method of claim 11 wherein:
    the captured shaping filter value is denoted by $h$;
    the captured input signal value is denoted by $v_2$;
    the value of the input signal at the center of the filtering interval is denoted by $v_e$; and
    obtaining $v_0$ from $h$ and $v_e$ according to the formula $$v_0 = h(1+K)(1-K)/2K + v_e,$$

where $K$ is a constant depending upon the details of the exponential decay time and the parameters describing the shaping filter; and
    $v_e$ is derived from $v_2$.

13. The method of claim 12 wherein:
    the shaping filter is a trapezoidal filter having a peaking time $L$ and a flattop time $G$;
    the exponential decay time of the input signal is denoted by $\tau$; and $$K = (L+G)/2\tau.$$

14. The method of claim 13 wherein:
    the input signal value $v_2$ is captured at time $L/2$ before the capture of the filtered signal $h$, adjusted for any filter delays, so that $v_e$ is related to $v_2$ according to the formula $v_e = (1+K)v_2 - Kv_0$; and
    $v_0$ is obtained from the formula $v_0 = h(1-K)/2K + v_2$.

15. The method of claim 11 wherein:
    for each new independent measure $v_0$, a new estimate of mean value $<V_0>'$ of the non-zero final value $V_0$ is made from the previous mean value estimate $<v_0>$ according to the formula $$<V_0>' = <V_0>(n-1)/n + v_0/n,$$

where $n$ is a constant.

16. The method of claim 15 where $n$ is a power of 2.

17. A method for analyzing a noisy input electronic signal containing step-like pulses with exponential decays, described by a time constant τ, between them to extract estimates of the step amplitudes of said pulses which are substantially independent of the slope values of the exponentially decaying component in the vicinity of the pulses by the steps of:

applying a filter, described by a set of one or more parameters, to said input signal to reduce its noise components;

generating a first weighted signal by weighting said filtered signal by a first constant; and generating a second weighted signal by weighting a time delayed version of said filtered signal by a second constant, wherein said first and second constants depend upon the values of the set of filter parameters, upon τ, and upon the value Δ of the time delay; and combining the first and second weighted signals to form an output signal which has a maximum for each step-like pulse, the value of said maximum being proportional to the amplitude of said pulse and substantially independent of the slope values of the exponentially decaying component in the vicinity of the pulse.

18. The method of claim 17 wherein the first and second constants are determined for a particular filter by the steps of:

mathematically expressing the difference between the value of said step-like pulse amplitude and the result of a simple subtraction of the value of said time delayed filtered signal from the value of the filtered signal itself in terms of the values of said set of filter parameters, decay constant τ, time delay Δ, and slopes of the exponentially decaying components' slope values in the vicinity of said step-like pulses;

applying the principle that the slope of a decaying exponential is directly proportional to its amplitude to express said slopes in terms of said filtered signal values; and solving for the pulse step amplitude in terms of the filter output amplitude and the time delayed filter output amplitude.

19. The method of claim 17 wherein the input signal is the output of a continuous discharge type preamplifier whose input is an x-ray or γ-ray detector; and the amplitudes of the steps represent the energies of the x-rays or γ-rays absorbed in the detector.

20. The method of claim 17 wherein only discrete measurements of said filtered and time delayed filtered signals are used to produce each step-like pulse amplitude estimate, by the additional steps, prior to said steps of generating first and second weighted signal, of:

capturing said filtered signal at an instant which is separated from the occurrence of the step-like pulse by a first time interval;

simultaneously capturing said time delayed filtered signal; and replacing said filtered and time delayed filtered signals by said captured values of the same in all subsequent steps in the method.

21. The method of claim 20 wherein said capturing steps are carried out only for those step-like pulses in the input signal which meet one or more validity criteria.

22. The methods of claim 21 where one of the validity criteria is that the pulse is not piled up.

23. The method of claim 20 wherein:

the captured filter and time delayed filter values are denoted by $<V_2>$ and $<V_1>$, respectively;

the estimate of the step amplitude is denoted by A; and

A is obtained from $<V_1>$ and $<V_2>$ according to the formula $$A=<V_2>(K+1)-<V_1>(K-1),$$

where K is a constant depending upon τ, Δ, and the values of the set of filter parameters.

24. The method of claim 23 wherein:

the filter is an averaging filter which operates over time $L_s$;

$L_s+G_s$ is the value of the said time delay Δ; and $K=(L_s+G_s)/2\tau$.

25. The method of claim 20 wherein the estimate of the step amplitude is further corrected for errors which arise when $V_0$, the asymptotic value toward which said input signal exponentially decays, is non-zero; by the additional steps of:

capturing values of $<V_1>$ and $<V_2>$ at times when no step pulses are present;

using these captured values to compute an independent measure $v_0$ of said non-zero asymptotic value $V_0$;

using one or more independent measures $v_0$ to estimate the mean value $<V_0>$ of the asymptotic value $V_0$; and using this mean estimated value $<V_0>$ to make said further correction.

26. The method of claim 25 wherein:

the captured filter and time delayed filter values are denoted by $<V_2>$ and $<V_1>$, respectively;

the estimate of the step amplitude is denoted by A; and

A is obtained from $<V_1>$, $<V_2>$ and $<V_0>$ according to the formula $$A=<V_2>(K+1)-<V_1>(K-1)-2K<V_0>,$$

where K is a constant depending upon τ, Δ, and the values of the set of filter parameters.

27. The method of claim 25 wherein said captured values of $<V_1>$ and $<V_2>$ at times when no step pulses are present are denoted by $v_1$ and $v_2$; and $v_0$ is computed according to the formula $$v_0=(v_2(K+1)-v_1(K-1))/2K.$$

28. The method of claim 25 wherein:

for each new estimate $v_0$, a new mean value estimate $<V_0>'$ of the asymptotic value $V_0$ is made from the previous mean value estimate $<V_0>$ according to the formula $$<V_0>'=<V_0>(n-1)/n+v_0/n,$$

where n is a constant.

29. The method of claim 28 where n is a power of 2.

30. An apparatus which, from a noisy input signal containing step-like pulses with exponential decays, described by a time constant τ, between them, extracts estimates of the step amplitudes of said pulses which are substantially independent of the slope values of the exponentially decaying components in the vicinity of the pulses, comprising:

a shaping filter, described by a set of one or more parameters, applied to said input signal to generate a filtered signal;

circuitry which generates a first weighted signal by weighting said filtered signal by a first constant that depends upon the values of the set of shaping filter parameters and upon τ;

circuitry which generates a second weighted signal by weighting said input signal by a second constant that depends upon the values of the set of shaping filter parameters and upon τ; and circuitry which combines the first and second weighted signals to generate a signal representing the filtered signal compensated for the exponentially decaying components' slope values in the vicinity of said step-like pulses.

31. The apparatus of claim 30 and further comprising a second, different filter coupled between the input signal and said circuitry which generates said second weighted signal, so that said second weighted signal includes the effect of said different filter.

32. An apparatus for analyzing a noisy input electronic signal containing step-like-pulses with exponential decays, described by a time constant τ, between them to extract estimates of the step amplitudes of said pulses which are substantially independent of the slope values of the exponentially decaying component in the vicinity of the pulses, comprising:

a filter, described by a set of one or more parameters, applied to said input signal to reduce its noise components and provide a filtered signal;

a circuit which generates a first weighted signal by weighting said filtered signal by a first constant; and a delay element which provides a time delayed version of said filtered signal;

a circuit which generates a second weighted signal by weighting said time delayed version of said filtered signal by a second constant; where said first and second constants depend upon the values of the set of filter parameters, upon τ, and upon the value Δ of the time delay; and a circuit which combines said first and second weighted signals to form an output signal which has a maximum for each step-like pulse, the value of said maximum being proportional to the amplitude of said pulse and substantially independent of the slope values of the exponentially decaying component in the vicinity of the pulse.

33. The apparatus of claim 32 wherein:

said filter is a digital filter having a FIFO, a subtracter, and an accumulator;

said delay element is a digital FIFO memory; and said circuit which generates a first weighted signal, said circuit which generates a second weighted signal, and said circuit which combines said first and second weighted signals are implemented in a programmed digital computer which receives said filtered signal and said time delayed version of said filtered signal.

34. The apparatus of claim 32 wherein:

said filter is an analog filter having that includes a first analog delay line, an inverter, and an integrator;

said delay element is a second analog delay line; and said circuit which generates a first weighted signal is a first resistive voltage divider;

said circuit which generates a second weighted signal is a second resistive voltage divider; and said circuit which combines said first and second weighted signals is an analog difference amplifier.

35. The apparatus of claim 32 wherein the input signal is the output of a continuous discharge type preamplifier whose input is an x-ray or γ-ray detector; and the amplitudes of the steps represent the energies of the x-rays or γ-rays absorbed in the detector.

* * * * *